(12) United States Patent  
Kashiwagi et al.

(10) Patent No.: US 6,798,454 B1  
(45) Date of Patent: Sep. 28, 2004

(54) SOLID STATE IMAGE SENSOR SYSTEM AND METHOD FOR DRIVING SAME

(75) Inventors: Minoru Kashiwagi, Chigasaki (JP); Yoshinori Kanesaka, Nagano-ken (JP)

(73) Assignees: Kabushiki Kaisha Toshiba, Kawasaki (JP); Seiko Epson Corporation, Tokyo-To (JP)

( * ) Notice: Subject to any disclaimer, the term of this patent is extended or adjusted under 35 U.S.C. 154(b) by 798 days.

(21) Appl. No.: 09/636,460

(22) Filed: Aug. 11, 2000

(30) Foreign Application Priority Data

Aug. 12, 1999 (JP) .......................................... 11-228382

(51) Int. Cl.[7] .......................... H04N 5/335; H04N 1/04
(52) U.S. Cl. ....................... 348/324; 358/483; 348/294
(58) Field of Search ................... 348/294, 324; 358/482, 483

(56) References Cited

U.S. PATENT DOCUMENTS

| | | | | |
|---|---|---|---|---|
| 4,540,901 A | * | 9/1985 | Suzuki ........................ 358/483 |
| 4,712,137 A | | 12/1987 | Kadekodi et al. | |
| 4,793,812 A | * | 12/1988 | Sussman et al. ............ 358/483 |
| 5,025,318 A | * | 6/1991 | Nagura ........................ 348/324 |
| 5,489,772 A | * | 2/1996 | Webb et al. .............. 250/208.1 |
| 5,642,207 A | * | 6/1997 | Smitt ........................ 358/483 |
| 5,973,311 A | * | 10/1999 | Sauer et al. ................ 348/302 |
| 6,166,831 A | * | 12/2000 | Boyd et al. ................ 348/308 |
| 6,489,992 B2 | * | 12/2002 | Savoye ...................... 348/340 |
| 6,570,615 B1 | * | 5/2003 | Decker et al. ............. 348/324 |

\* cited by examiner

Primary Examiner—Andrew Christensen
Assistant Examiner—Nhan T. Tran
(74) Attorney, Agent, or Firm—Oblon, Spivak, McClelland, Maier & Neustadt, P.C.

(57) ABSTRACT

Every time signal charges, which are generated in pixels "1", "3", "5", . . . of one 1a of pixel rows 1a and 1b spaced from each other by a distance D, are transferred to a final stage 4a of an analog shift register 3a to be fed to a charge detecting part 5 in synchronism with a transfer clock Φ1B, a reset pulse RS is generated to discharge the signal charges to a reset drain 8. Signal charges, which are generated in pixels "2", "4", "6", . . . of the other pixel row 1b, are transferred to a final stage 4b of an analog shift register 3b, and then, stored in a capacity 6 of the charge detecting part 5 in synchronism with a transfer clock Φ2B. Then, the quantity of the stored signal charges is read out, and the stored signal charges are outputted from an output circuit 9 as an output signal OS. Thus, all of the signal charges of the pixel row 1a are discarded, and only the signal charges of the pixel row 1b are outputted, so that the signal charges can be read out at a resolution of ½ without deteriorating images.

4 Claims, 8 Drawing Sheets

SOLID STATE IMAGE SENSOR SYSTEM AND METHOD FOR DRIVING SAME

BACKGROUND OF THE INVENTION

The present invention relates generally to a solid state image sensor system and a method for driving the same. More specifically, the invention relates to a solid state image sensor system having a plurality of pixel rows and a method for driving the same.

Figure 4:
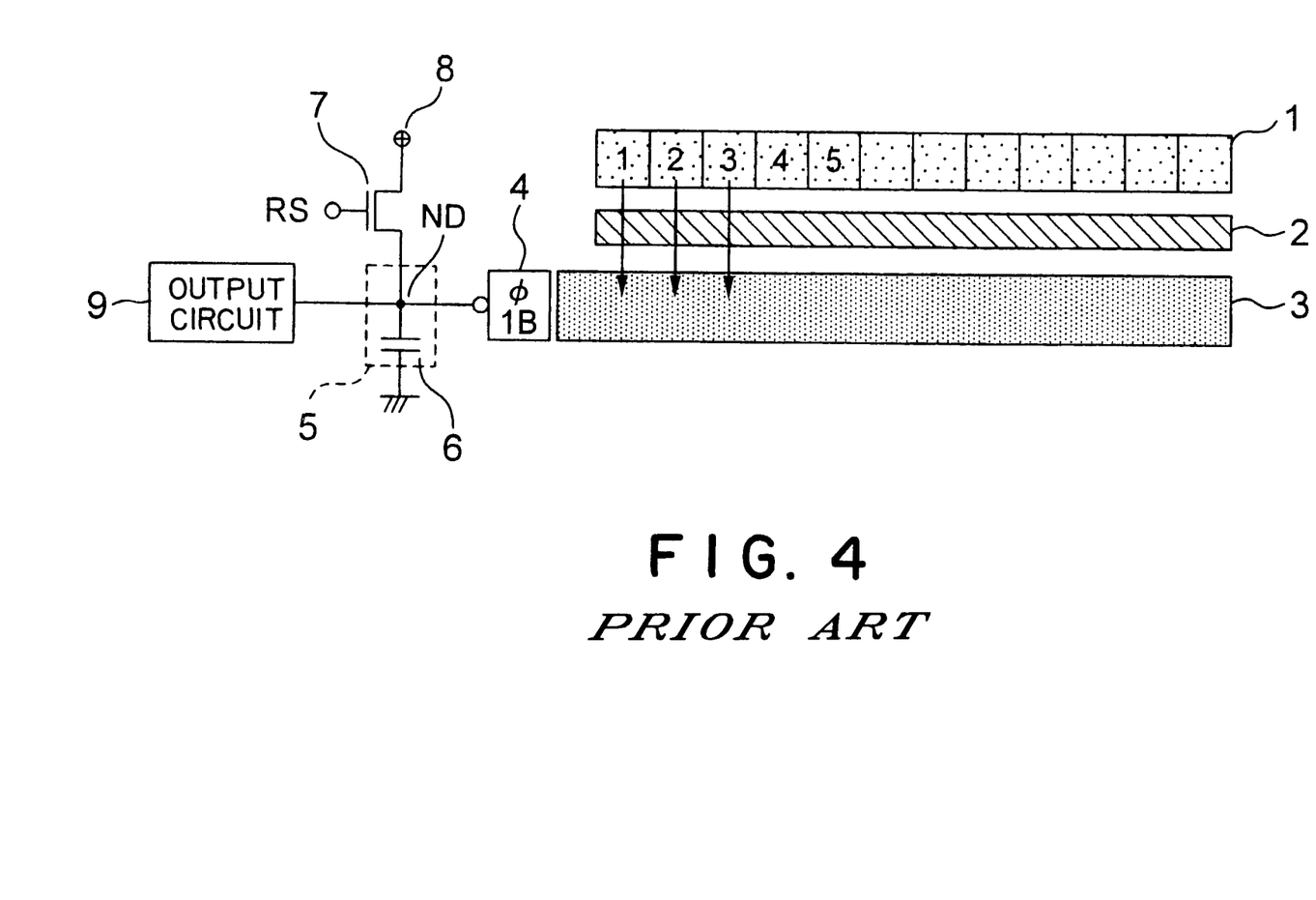
FIG. 4 is a plan view of a solid state image sensor system having a single pixel row.
Figure 5:
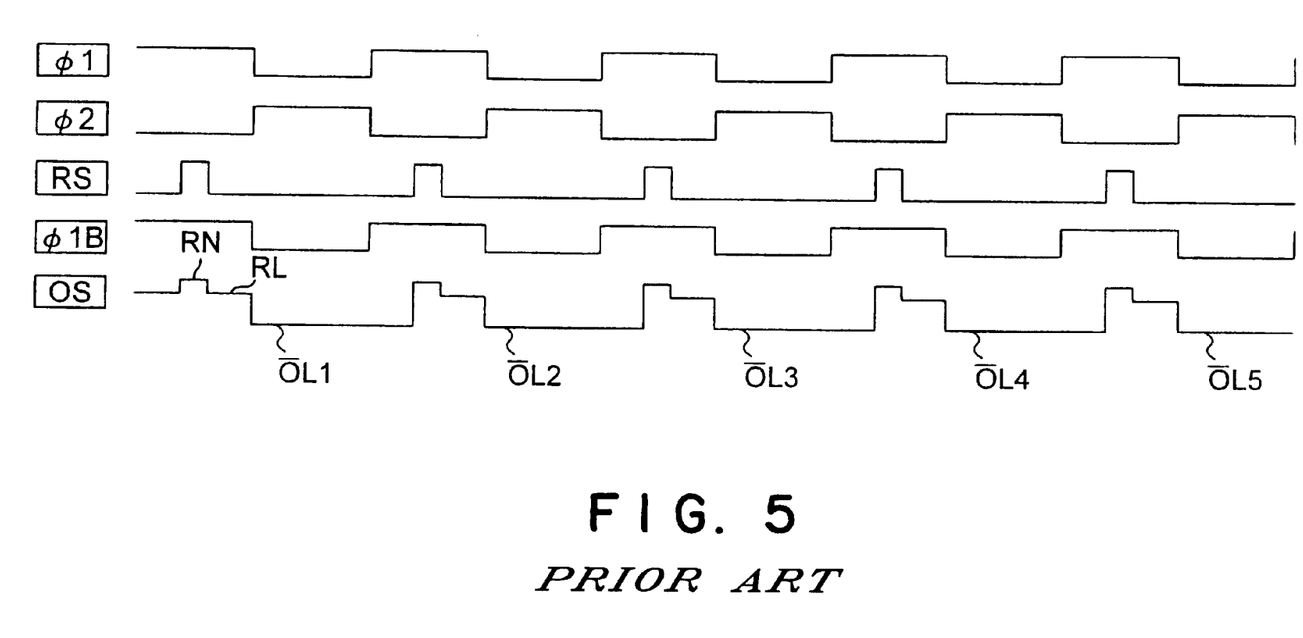
FIG. 5 is a time chart showing a driving waveform when signal charges are read out of all of pixels in the solid state image sensor system of FIG. 4.

FIG. 4 shows the construction of a solid state image sensor system having a single pixel row, and FIG. 5 shows a time chart for transfer clocks Φ1 and Φ2, a reset pulse RS, a clock Φ1B in the final stage of a shift register, and an output signal OS, which are used for reading signal charges of all of picture elements (pixels) in the system of FIG. 4.

In a pixel row 1 having a plurality of pixels "1", "2", "3", . . . , incident light is photoelectric-transferred to generate and store signal charges. The signal charges are transferred to an analog shift register 3 via a shift gate 2, which is arranged adjacent to the pixel row 1, as shown by arrows.

In the analog shift register 3, inverse-phase transfer clocks Φ1 and Φ2 are alternately applied to a transfer electrode (not shown). Thus, the signal charges are sequentially shifted to the left in the figure.

The signal charges transferred to the final stage 4 of the analog shift register 3 are sequentially given to a charge detecting part 5 in synchronism with a transfer clock Φ1B. The charge detecting part 5 has a capacity 6 between a node ND, which is connected to the final stage 4, and a grounding terminal to detect a voltage corresponding to the quantity of signal charges stored in the capacity 6. This voltage is given to an output circuit 9 for amplifying the given voltage to a required level to output an output signal OS.

In addition, a reset gate transistor 7 is provided between the node ND and a reset drain 8, to which a power supply voltage is applied. When a reset pulse RS is applied to the gate of the reset gate transistor 7, the signal charges having been stored in the capacity 6 are discharged to the reset drain 8.

The output signal OS varies as shown in FIG. 5. If the reset pulse RS is given while the transfer clock Φ1B in the final stage 4 is in a high level, a reset noise RN is generated in the output signal OS. After the reset noise RN is generated, the level of the output signal OS becomes a reference level RL. This reference level RL corresponds to an output level when no signal charge is stored in the capacity 6. Then, when the level of the transfer clock Φ1B becomes a low level, the signal charges are transferred from the final stage 4 to the capacity 6 to be stored therein. At this time, the difference between the reference level RL and an output level OL1 corresponds to the quantity of the stored signal charges. Thus, the signal charges can be read out of all of pixels of the pixel row 1.

Figure 6:
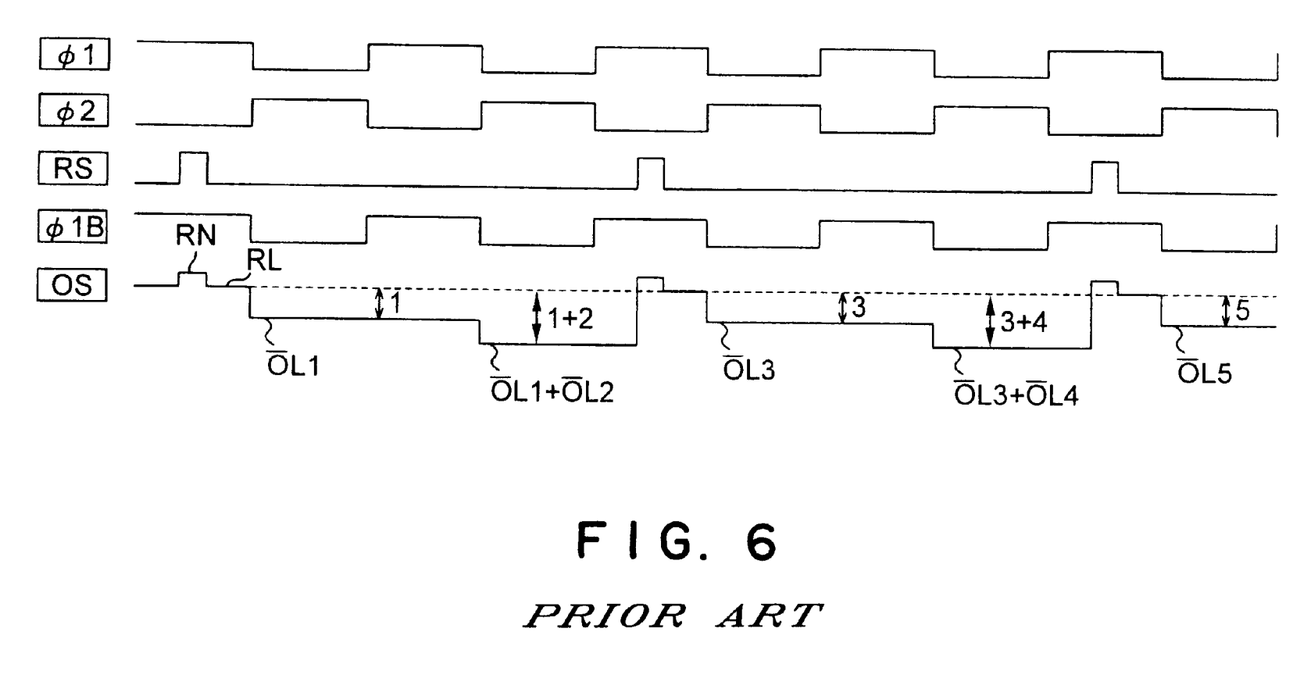
FIG. 6 is a time chart showing a conventional driving waveform when signal charges are read out at a resolution of ½ in the solid state image sensor system of FIG. 4.

Then, when signal charges are read out of alternate pixels of the pixels 1, 2, 3, . . . , the system is driven in timing as shown in FIG. 6. Such a technique for reading signal charges out of alternate pixels to reduce resolution is used for reducing the quantity of data, for example.

Transfer clocks Φ1 and Φ2 applied to the transfer electrode of the analog shift register 3, and a transfer clock Φ1B applied to the transfer electrode of the final stage 4 are the same as those when the signal charges are read out of all of the pixels as shown in FIG. 5. It is different from FIG. 5 that reset pulses RS given to the reset gate 7 are alternately generated.

In this case, the output signal OS outputted from the output circuit 9 is as follows. While the transfer clock Φ1B is in a high level, after a reset noise RN is generated, the level of the output signal OS becomes the reference level RL. When the level of the transfer clock Φ1B becomes a low level, the signal charges read out of the pixel 1 are stored in the capacity 6, and the level of the output signal OS becomes a level OL1 corresponding to the quantity of the stored signal charges. This level OL1 is held until the level of the next transfer clock Φ1B falls to the low level after it becomes the high level. When it falls to the low level, the signal charges read out of the pixel 2 are added to the capacity 6. Thus, the level of the output signal OS becomes a level OL1+OL2 corresponding to the total quantity of the signal charges of the pixels 1 and 2.

In this case, the number of pixels, from which signal charges are read out, is reduced to half, so that the resolution is reduced to half.

When signal charges are read out of one pixel every n (n is an integer which is 2 or more) pixels, every time the level of the transfer clock Φ1B falls from a high level to a low level, the level of the output signal OS varies so as to be sequentially OL1, OL1+OL2, . . . , OL1+ . . . +OLn. In this case, the resolution is reduced to 1/n.

Figure 2:
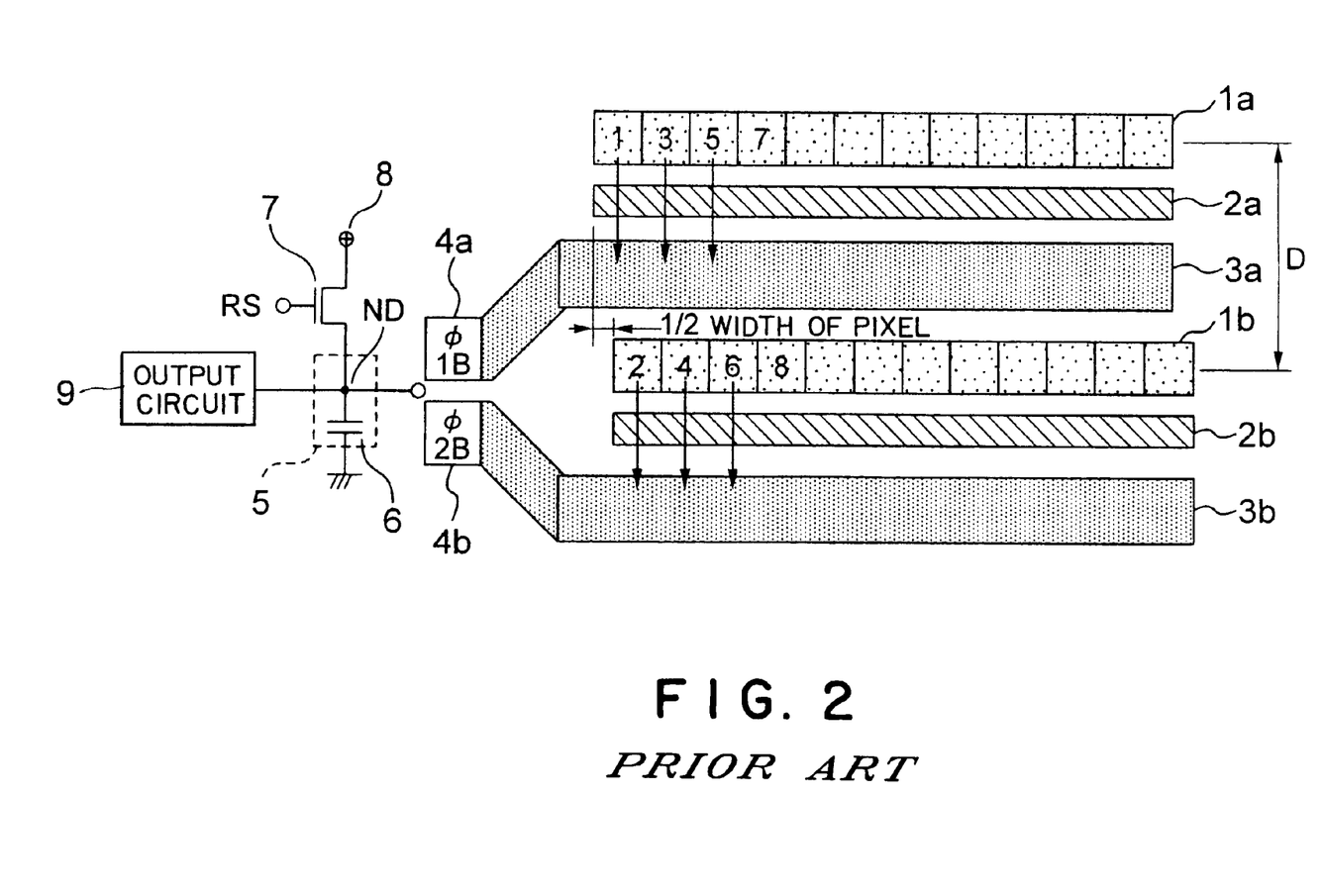
FIG. 2 is a plan view of the solid state image sensor system.

FIG. 2 shows the construction of a solid state image sensor system wherein two pixel rows 1a and 1b are shifted by a width corresponding to ½ pixel to be arranged in a staggered form.

In the pixels "1", "3", "5", of the pixel row 1a, incident light is photoelectric-transferred, so that signal charges are generated and stored. Similarly, in the pixels "2", "4", "6", . . . of the pixel row 1b, incident light is photoelectric-transferred to generate and store signal charges. The signal charges are transferred from the pixel rows 1a and 1b to analog shift registers 3a and 3b via shift gates 2a and 2b, which are arranged adjacent to the pixel rows 1a and 1b, respectively.

In the analog shift registers 3a and 3b, inverse-phase transfer clocks Φ1 and Φ2 are alternately applied to transfer electrodes (not shown). Thus, the signal charges are sequentially shifted to the left in the figure.

The signal charges transferred to the final stages 4a and 4b of the analog shift registers 3a and 3b are sequentially given to a common charge detecting part 5 in accordance with transfer clocks Φ1B and Φ2B, respectively. The charge detecting part 5 has a capacity 6 between a node ND, which is connected to the final stages 4a and 4b, and a grounding terminal to detect a voltage corresponding to the quantity of signal charges stored in the capacity 6. This voltage is given to an output circuit 9 for amplifying the given voltage to a required level to output an output signal OS.

Similar to the system shown in FIG. 4, a reset gate transistor RS is provided between the node ND and a reset drain 8, to which a power supply voltage is applied. When a reset pulse RS is applied to the gate of the reset gate transistor RS, the signal charges having been stored in the capacity 6 are discharged to the reset drain 8.

Figure 7:
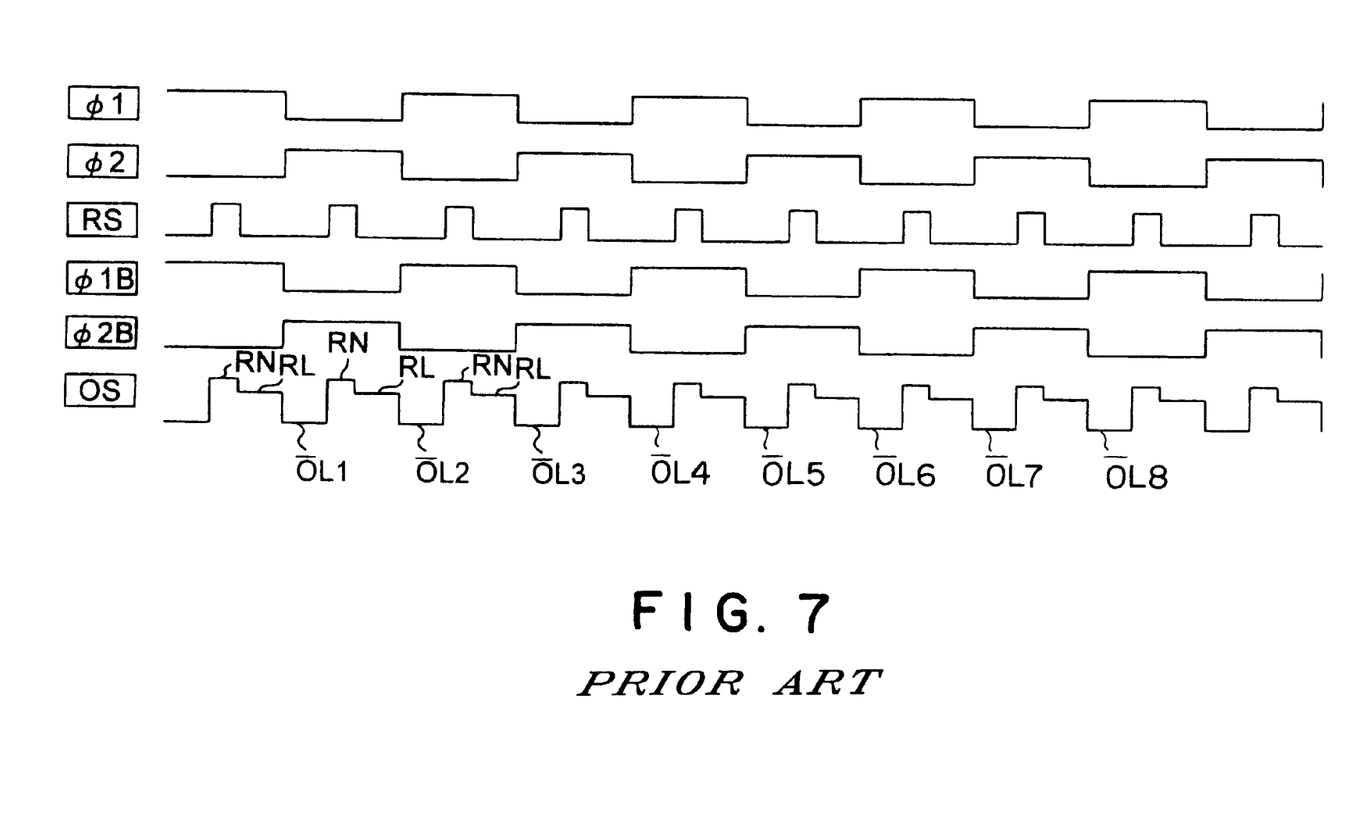
FIG. 7 is a time chart showing a driving waveform when signal charges are read out of all of pixels in the solid state image sensor system having two pixel rows shown in FIG. 2.

In this case, the output signal OS varies as shown in FIG. 7. If the reset pulse RS is given while the transfer clock Φ1B in the final stage 4a, to which the signal charges are transferred from the pixel row 1a, is in a high level, a reset noise RN is generated in the output signal OS. After the reset noise RN is generated, the level of the output signal OS becomes a reference level RL. When the level of the transfer clock Φ1B becomes a low level, the signal charges are transferred from the final stage 4a to the capacity 6 to be stored therein. At this time, the difference between the reference level RL and an output level OL1 corresponds to the quantity of the stored signal charges generated from the pixel "1".

Then, if the reset pulse RS is given while the transfer clock Φ2B in the final stage 4b, to which the signal charges are transferred from the pixel row 1b, is in a high level, a reset noise RN is generated in the output signal OS. After the reset noise RN is generated, the level of the output signal OS becomes the reference level RL. When the level of the transfer clock Φ2B becomes a low level, the signal charges are transferred from the final stage 4b to the capacity 6 to be stored therein. At this time, the difference between the reference level RL and an output level OL2 corresponds to the quantity of the stored signal charges generated from the pixel "2". Thus, the signal charges can be alternately read out of all of the pixels "1", "2", "3", "4", . . . of the pixel rows 1a and 1b.

Figure 8:
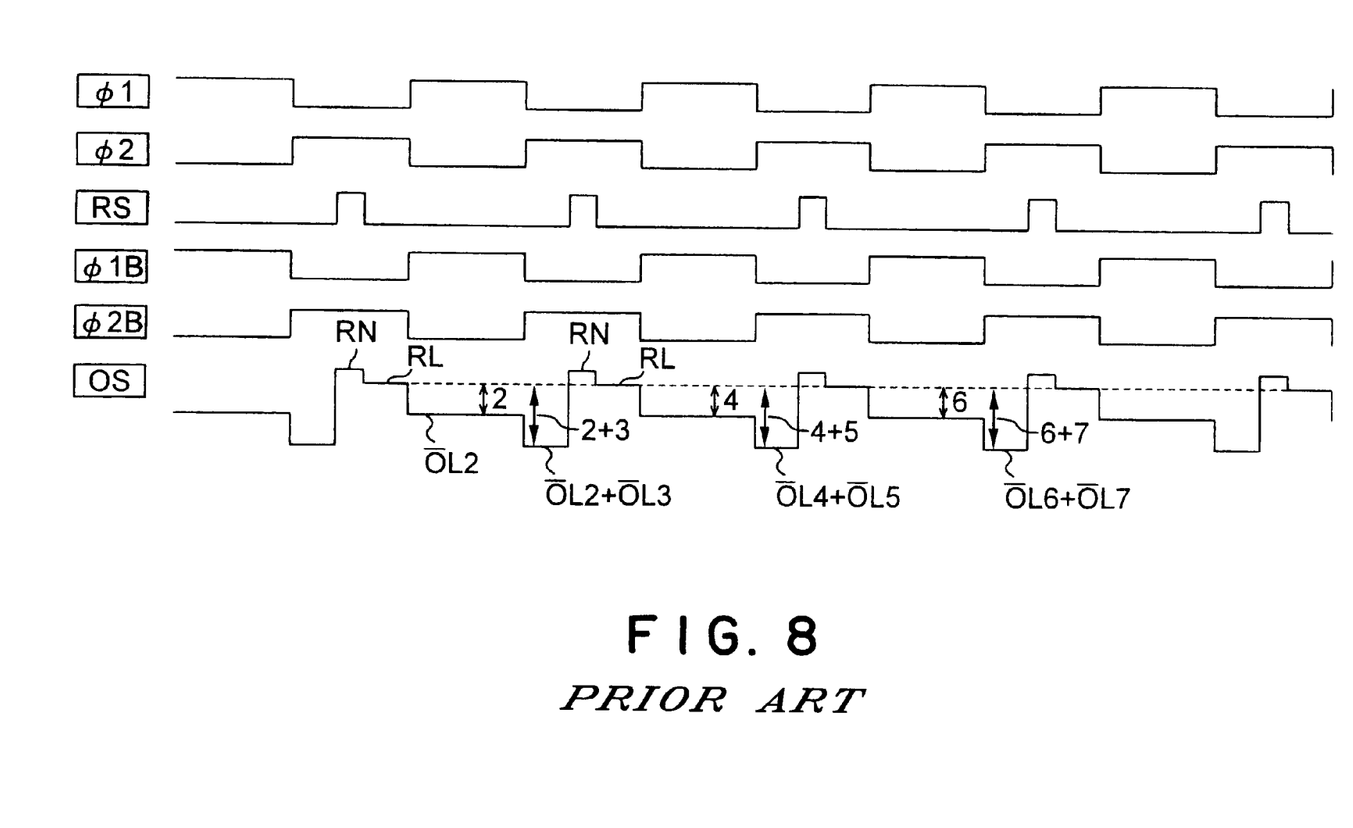
FIG. 8 is a time chart showing a conventional driving waveform when signal charges are read out at a resolution of ½ in the solid state image sensor system having two pixel rows shown in FIG. 2.

Then, a case where signal charges are read out of alternate pixels of the system shown in FIG. 2 will be described. In this case, a driving waveform is shown in FIG. 8. Transfer clocks Φ1 and Φ2, which are applied to the transfer electrodes of the analog shift register 3a and 3b, respectively, and transfer clocks Φ1B and Φ2B, which are applied to the transfer electrodes of the final stages 4a and 4b, respectively, are the same as those when the signal charges are read out of all of the pixels as shown in FIG. 5. It is different from FIG. 5 that reset pulses RS given to the reset gate 7 are generated in alternate cycles.

In this case, the output signal OS outputted from the output circuit 9 is as follows. While the transfer clock Φ2B in the final stage 4b is in a high level, after a reset noise RN is generated, the level of the output signal OS becomes the reference level RL. When the level of the transfer clock Φ2B becomes a low level, the signal charges read out of the pixel 2 are stored in the capacity 6, and the level of the output signal OS becomes a level OL2 corresponding to the quantity of the stored signal charges.

While the transfer clock Φ2B is in the low level, the transfer clock Φ1B in the final stage 4a is in the high level. When the transfer clock Φ1B falls to the low level, the signal charges read out of the pixel 3 are stored in the capacity 6. Thus, the output level OS becomes an output level OL2+OL3 obtained by adding the signal charges of the pixel 3 to the signal charges of the pixel 2, which have been already stored. This output level OL2+OL3 is held until the next reset pulse is outputted.

In this case, the number of pixels, from which signal charges are read out, is reduced to half, so that the resolution is reduced to half. If n pixel rows are provided and if signal charges read out of n pixels of each of the pixel rows are outputted together as one output level, every time the levels of the transfer clocks Φ1B, Φ2B, . . . , ΦnB fall to a low level, the level of the output signal OS varies so as to be sequentially OL1, OL1+OL2, . . . , OL1+ . . . +OLn. In this case, the resolution is reduced to 1/n.

However, in the solid state image sensor system shown in FIG. 2 wherein the plurality of pixel rows are arranged, the pixel row 1a is spaced from the pixel row 1b by a distance D. Therefore, if the signal charges from the pixel "3", of the pixel row 1a are added to the signal charges from the pixel "2" of the pixel row 1b to output the output level OL2+OL3, there is a problem in that the obtained image deteriorates.

SUMMARY OF THE INVENTION

It is therefore an object of the present invention to eliminate the aforementioned problems and to provide a solid state image sensor system which is provided with a plurality of pixel rows and which is capable of preventing the deterioration of an image even if the number of output signals is reduced to 1/n of the number of pixels to read out signal charges at a resolution of 1/n.

In order to accomplish the aforementioned and other objects, according to one aspect of the present invention, a solid state image sensor system comprises n (n is an integer which is 2 or more) pixel rows, each of which has pixels arranged in a row, each of the pixels being irradiated with light to carry out a photoelectric transfer to generate a signal charge, wherein only a signal charge, which is generated in one of the n pixel rows, is read out when the signal charge is read out at a resolution of 1/n.

According to another aspect of the present invention, a solid state image sensor system comprises n (n is an integer which is 2 or more) pixel rows, each of which has pixels arranged in a row, each of the pixels being irradiated with light to carry out a photoelectric transfer to generate a signal charge, wherein signal charges, which are generated from adjacent m pixels of one of the n pixel rows, are added up to read out signal charges, which are generated in the one of the n pixel rows, when the signal charges are read out at a resolution of 1/n*m (m is an integer which is 2 or more).

According to another aspect of the present invention, a solid state image sensor system comprises: n (n is an integer which is 2 or more) pixel rows, each of which has pixels arranged in a row, each of the pixels being irradiated with light to carry out a photoelectric transfer to generate a signal charge; n analog shift registers, each of which is provided for each of the pixel rows to sequentially transfer a signal charge, which is generated from a corresponding one of the pixel rows; a charge detecting part, which is provided commonly for all of the analog shift registers, and to which signal charges are alternately given from a final stage of each of the analog shift registers, for storing and detecting the signal charges; and a reset drain for discharging the signal charges stored in the charge detecting part, wherein when the signal charges are read out at a resolution of 1/n, signal charges generated in one of the n pixel rows are detected by the charge detecting part, and signal charges generated in other n−1 pixel rows of the n pixel rows are discharged to the reset drain.

According to a further aspect of the present invention, there is provided a method for driving a solid state image sensor system comprising n (n is an integer which is 2 or more) pixel rows, each of which has pixels arranged in a row, each of the pixels being irradiated with light to carry out a photoelectric transfer to generate a signal charge, wherein the solid state image sensor system is driven so as to read out only a signal charge, which is generated in one of the n pixel rows, when the signal charge is read out at a resolution of 1/n.

According to a still further aspect of the present invention, there is provided a method for driving a solid state image sensor system comprising n (n is an integer which is 2 or more) pixel rows, each of which has pixels arranged in a row, each of the pixels being irradiated with light to carry out a photoelectric transfer to generate a signal charge, wherein the solid state image sensor system is driven so as to add up signal charges, which are generated from adjacent m pixels of one of the n pixel rows, to read out signal charges, which are generated in the one of the n pixel rows, when the signal charges are read out at a resolution of 1/n*m (m is an integer which is 2 or more).

According to the above described solid state image sensor system and method for driving the same, even if a reading resolution is reduced to 1/n in the system having n pixel rows, it is possible to obtain a desired resolution without deteriorating images by reading signal charges out of only one of the pixel rows and discarding all of signal charges from other pixel rows. In addition, it is possible to obtain a resolution of 1/m*n while preventing the deterioration of images by adding up and reading signal charges of adjacent m pixels in one of the n pixel rows.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

Figure 1:
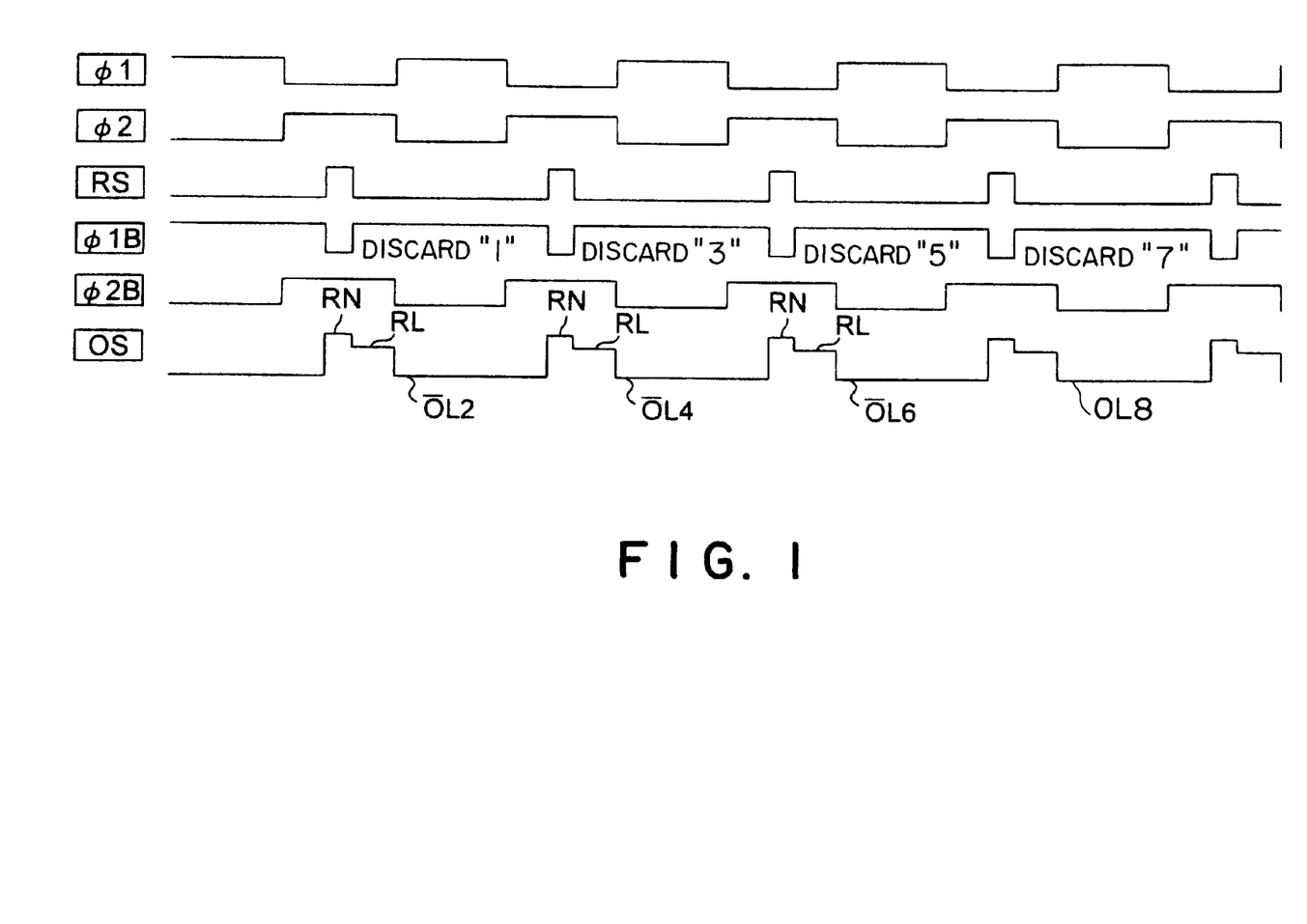
FIG. 1 is a time chart showing a driving waveform for use in a first preferred embodiment of a solid state image sensor system according to the present invention.

In the first preferred embodiment of the present invention, a solid state image sensor system shown in FIG. 2 is designed to read out signal charges by using a driving signal having a waveform shown in FIG. 1. This preferred embodiment is characterized in that when signal charges are read out at a resolution of ½, signal charges of only one of pixel rows 1a and 1b are received, and all of signal charges of the other pixel row are discarded. Comparing the driving waveform in this preferred embodiment with the driving waveform shown in FIG. 8, the transfer clock Φ1B applied to the final stage 4a of the pixel row 3a is different. This transfer clock Φ1B is in a low level only while a reset pulse RS is generated, and remains being in a high level for other periods of time.

If a reset pulse RS is generated while the transfer clock Φ2B in the final stage 4b is in a high level, a reset noise RN is generated in an output signal OS. While the reset pulse RS is generated, the transfer clock Φ1B is in the low level. Thus, the signal charges transferred from the pixel row 1a to the final stage 4a are transferred to the capacity 6 of the signal charge storing part 5. However, since the reset pulse RS is applied to the gate of the reset gate 7 at this time, these signal charges are immediately discharged to the reset drain 8.

After the reset pulse RS is generated, the level of the output signal OS becomes a reference revel RL. If the level of the transfer clock Φ2B becomes a low level, the signal charges transferred from the pixel "2" to the final stage 4b are stored in the capacity 6. At this time, the output level OL2 corresponds to the quantity of the stored signal charges transferred from the pixel "2".

Then, the level of the transfer clock Φ2B in the final stage 4b becomes the high level. When a reset pulse RS is given, a reset noise RN is generated in the output level OS. Then, the level of the transfer pulse Φ1B becomes the low level again simultaneously with the reset pulse RS, so that the signal charges read out of the pixel "3" of the pixel row 1a are discharged. After the reset noise RN is generated, the level of the output signal OS becomes the reference level RL. When the level of the transfer clock Φ2B becomes the low level, the signal charges read out of the pixel "4" are transferred to the capacity 6 to be stored therein. At this time the output level OL4 corresponds to the quantity of the stored signal charges generated from the pixel "4". Thus, all of the signal charges from the pixels of the odd pixel row 1a are discarded, and all of the signal charges from the pixels "2", "4", "6", "8", . . . of the even pixel row 1b are read out, so that the resolution can be reduced to half.

According to this preferred embodiment, it is possible to reduce the number of pixels, from which signal charges are read out, to half to reduce the resolution to half without adding up the signal charges generated in the pixel rows 1a and 1b which are spaced from each other by the distance D. Therefore, it is possible to prevent the deterioration of images, which has a conventionally occurred.

The second preferred embodiment of a solid state image sensor system according to the present invention, and a method for driving the same will be described below. This preferred embodiment is characterized in that signal charges of only one of the odd pixel row 1a and the even pixel row 1b are taken out using a driving signal having a waveform shown in FIG. 3, and adjacent two pixels included in the one of the pixel rows are added up to output signal charges. Comparing the driving waveform in this preferred embodiment with the driving waveform shown in FIG. 1 which has been used in the first preferred embodiment, it is different that the intervals of the reset pulse RS and the transfer clock Φ1B are twice.

Figure 3:
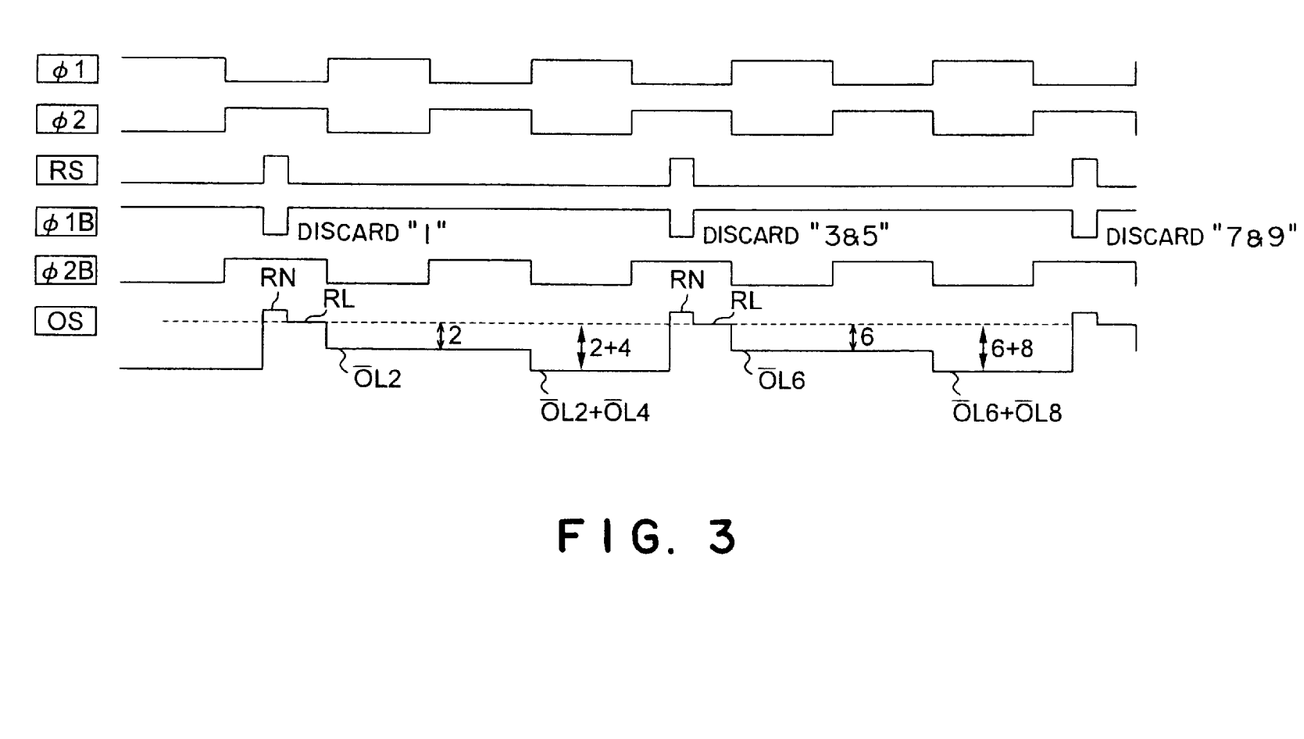
FIG. 3 is a time chart showing a driving waveform for use in a second preferred embodiment of a solid state image sensor system according to the present invention.

If a reset pulse RS is generated while the transfer clock Φ2B in the final stage 4b is in a high level, a reset noise RN is generated in an output signal OS. While the reset pulse RS is generated, the transfer clock Φ1B is in the low level. Thus, the signal charges transferred from the pixel row 1a to the final stage 4a are transferred to the capacity 6 of the signal charge storing part 5. However, these signal charges are immediately discharged to the reset drain 8, since the reset pulse RS is applied to the gate of the reset gate 7.

After the reset pulse RS is generated, the level of the output signal OS becomes a reference revel RL. If the level of the transfer clock Φ2B becomes a low level, the signal charges transferred from the pixel "2" to the final stage 4b are stored in the capacity 6. At this time, the output level OL2 corresponds to the quantity of the stored signal charges transferred from the pixel "2".

Then, the level of the transfer clock Φ2B in the final stage 4b becomes the high level. For this period of time, no reset pulse RS is generated, and the level of the transfer clock Φ1B also does not become the low level. Therefore, the signal charges are not transferred from the final stage 4a of the pixel row 1 to the charge detecting part 5, so that the state stored in the final stage 4a is held. Therefore, the level of the output signal OS remains being the output level OL2.

When the level of the transfer clock Φ2B falls to the low level, the signal charges of the pixel "4" are transferred from the final stage 4b to the charge detecting part 5, so that the level of the output signal OS becomes the sum of OL2 and OL4.

Then, when the level of the transfer clock Φ2B becomes the high level, a reset pulse RS is generated, and a reset noise RN is generated in the output level OS. The level of the transfer pulse Φ1B becomes the low level simultaneously with the reset pulse RS, so that the signal charges read out of the pixels "3" and "5" of the pixel row 1a are simultaneously discharged. After the reset noise RN is generated, the output level OS becomes the reference level RL. When the level of the transfer clock Φ2B becomes the low level, the signal charges read out of the pixel "6" are transferred to the capacity 6 to be stored therein. At this time, the output level OL corresponds to the quantity of the stored signal charges generated from the pixel "6".

Thus, all of the signal charges from the pixels of the odd pixel row 1a are discarded, and the signal charges of adjacent two of the pixels of the even pixel row 1b, such as "2"+"4", "6"+"8", . . . , are added up to be read out. By thus adding up the signal charges from adjacent two of the pixels of one pixel row 1b of the pixel rows 1a and 1b to read out the signal charges, it is possible to reduce the resolution to ¼.

According to this preferred embodiment, it is possible to obtain a desired resolution of ¼ by discarding the signal charges of one of the pixel rows 1a and 1b and reading the signal charges out of the other pixel row without adding up the signal charges generated from the pixel rows 1a and 1b which are spaced from each other by the distance D. Therefore, it is possible to prevent the deterioration of images, which has conventionally occurred.

The present invention should not be limited to the above described preferred embodiments. For example, two pixel rows have been provided in the above described first and second preferred embodiments. However, even if three or more pixel rows are provided, the present invention can be applied. That is, if n (n is an integer which is 2 or more) pixel rows are provided, signal charges generated in one of the pixel rows may be read out, and signal charges generated in other n−1 pixel rows may be discarded. Thus, it is possible to obtain a desired resolution of 1/n without adding up signal charges of different pixel rows which are spaced from each other, so that it is possible to prevent the deterioration of images.

In addition, when signal charges of one of a plurality of pixel rows are read out, if the signal charges from adjacent two pixels in this pixel row are added up similar to the above described second preferred embodiment, the resolution can be reduced to ½n. This is the same if the signal charges of three or more pixels are added up. In this case, the resolution can be reduced to 1/m*n (n is an integer which is 2 or more).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A solid state image sensor system comprising:

n (n is an integer which is 2 or more) pixel rows, each of which has pixels arranged in a row, each of said pixels being irradiated with light to carry out a photoelectric transfer to generate a signal charge;

n analog shift registers, each of which is provided for each of said pixel rows to sequentially transfer a signal charge, which is generated from a corresponding one of said pixel rows;

a charge detecting part, which is provided commonly for all of said analog shift registers, and to which signal charges are alternately given from a final stage of each of said analog shift registers, for storing and detecting said signal charges; and a reset drain for discharging said signal charges stored in said charge detecting part, wherein a final stage of each of said analog shift registers and a rest of each of said analog shift registers are configured to be driven independently, and when said signal charges are read out at a resolution of 1/n, signal charges generated in one of said n pixel rows are detected by said charge detecting part, and signal charges generated in other n−1 pixel rows of said n pixel rows are discharged to said reset drain, in accordance with a transfer clock applied on the final stage.

2. A method for driving a solid state image sensor system comprising n (n is an integer which is 2 or more) pixel rows, each of said pixels being irradiated with light to carry out a photoelectric transfer to generate a signal charge;

n analog shift registers, each of which is provided for each of said pixel rows to sequentially transfer a signal charge, which is generated from a corresponding one of said pixel rows;

a charge detecting part, which is provided commonly for all of said analog shift registers, and to which signal charges are alternately given from a final stage of each of said analog shift registers, for storing and detecting said signal charges; and a reset drain for discharging said signal charges stored in said charge detecting part, the method comprising:

driving the solid stage image sensor system to drive a final stage of each of said analog shift registers and a rest of each of said analog shift registers independently, and when said signal charges are read out at a resolution of 1/n, signal charges generated in one of said n pixel rows are detected by said charge detecting part, and signal charges generated in other n−1 pixel rows of said n pixel rows are discharged to said reset drain, in accordance with a transfer clock applied on the final stage.

3. A solid stage image sensor system comprising:

n (n is an integer which is 2 or more) pixel rows, each of which has pixels arranged in a row, each of said pixels being irradiated with light to carry out a photoelectric transfer to generate a signal charge;

n analog shift registers, each of which is provided for each of said pixel rows to sequentially transfer a signal charge, which is generated from a corresponding one of said pixel rows;

a charge detecting part, which is provided commonly for all of said analog shift registers, and to which signal charges are alternately given from a final stage of each of said analog shift registers, for storing and detecting said signal charges; and a reset drain for discharging said signal charges stored in said charge detecting part, wherein a final stage of each of said analog shift registers and a rest of each of said analog shift registers are configured to be driven independently, and when said signal charges are read out at a resolution of $1/n*m$ (m is an integer which is 2 or more), signal charges which are generated from adjacent m pixels of one of said n pixel rows and signal charges which are generated in one of said n pixel rows and detected by said charge detecting part are added up to be read out, and signal charges generated in other n−1 pixel rows of said n pixel rows are discharged to said reset drain, in accordance with a transfer clock applied on the final stage.

4. A method for driving a solid state image sensor system comprising n (n is an integer which is 2 or more) pixel rows, each of said pixels being irradiated with light to carry out a photoelectric transfer to generate a signal charge, n analog shift registers, each of which is provided for each of said pixel rows to sequentially transfer a signal charge, which is generated from a corresponding one of said pixel rows, a charge detecting part, which is provided commonly for all of said analog shift registers, and to which signal charges are alternately given from a final stage of each of said analog shift registers, for storing and detecting said signal charges, and a reset drain for discharging said signal charges stored in said charge detecting part, the method comprising:

driving the solid stage image sensor system to drive a final stage of each of said analog shift registers and a rest of each of said analog shift registers independently, and when said signal charges are read out at a resolution of $1/n*m$ (m is an integer which is 2 or more), signal charges which are generated from adjacent m pixels of one of said n pixel rows and signal charges which are generated in one of said n pixel rows and detected by said charge detecting part are added up to be read out, and signal charges generated in other n−1 pixel rows of said n pixel rows are discharged to said reset drain, in accordance with a transfer clock applied on the final stage.

* * * * *